(12) United States Patent
Panchaksharaiah et al.

(10) Patent No.: US 10,779,058 B2
(45) Date of Patent: Sep. 15, 2020

(54) SYSTEM AND METHODS FOR SELECTING AND GENERATING PORTIONS OF A TARGET MEDIA ASSET FOR ADVERTISING THE TARGET MEDIA ASSET WHILE THE USER WATCHES A MEDIA ASSET

(71) Applicant: Rovi Guides, Inc., San Jose, CA (US)

(72) Inventors: Vishwas Sharadanagar Panchaksharaiah, Karnataka (IN); K Vishnu Vardhan, Tirupati (IN); Srikanth Channapragada, Bangalore (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/018,859

(22) Filed: Jun. 26, 2018

(65) Prior Publication Data

US 2019/0394535 A1 Dec. 26, 2019

(51) Int. Cl.
| | |
|---|---|
| *H04N 21/21* | (2011.01) |
| *H04N 21/236* | (2011.01) |
| *H04N 21/466* | (2011.01) |
| *H04N 21/845* | (2011.01) |
| *H04N 21/81* | (2011.01) |
| *H04N 21/235* | (2011.01) |
| *H04N 21/45* | (2011.01) |
| *H04N 21/442* | (2011.01) |

(52) U.S. Cl.
CPC ........ *H04N 21/812* (2013.01); *H04N 21/236* (2013.01); *H04N 21/2353* (2013.01); *H04N 21/44222* (2013.01); *H04N 21/4532* (2013.01); *H04N 21/4668* (2013.01); *H04N 21/8456* (2013.01)

(58) Field of Classification Search
CPC .............. H04N 21/812; H04N 21/236; H04N 21/4532; H04N 21/44222; H04N 21/2353; H04N 21/4668; H04N 21/8456
See application file for complete search history.

(56) References Cited

U.S. PATENT DOCUMENTS

| | | |
|---|---|---|
| 6,564,378 B1 | 5/2003 | Satterfield |
| 7,165,098 B1 | 1/2007 | Boyer et al. |
| 7,761,892 B2 | 7/2010 | Ellis et al. |
| 8,046,801 B2 | 10/2011 | Ellis et al. |

(Continued)

*Primary Examiner* — Pinkal R Chokshi
(74) *Attorney, Agent, or Firm* — Haley Guiliano LLP

(57) ABSTRACT

Systems and methods are described for aggressive advertisement of media content. The system, using a prominent attribute of a first media asset, selects, from a plurality of candidate media assets for partial exposure to the user, a second media asset that features the prominent attribute. In response to determining the end to the first scene, the system determines a second attribute of the first scene and plays back a first segment of the second media asset featuring the prominent attribute and the second attribute, and resumes playback of the first media asset. During the resumed playback of the first media asset, the system detects a third attribute of a second scene. In response to determining an end of the second scene, the system plays back a second segment of the second media asset featuring the prominent attribute and the third attribute before resuming playback of the first media asset.

22 Claims, 10 Drawing Sheets

(56) References Cited

U.S. PATENT DOCUMENTS

| | | | |
|---|---|---|---|
| 8,955,021 B1* | 2/2015 | Treder | H04N 21/47217 |
| | | | 725/93 |
| 9,906,827 B2* | 2/2018 | Riedl | H04N 21/23424 |
| 10,015,561 B2* | 7/2018 | Ballai | H04N 21/23418 |
| 2002/0174430 A1 | 11/2002 | Ellis et al. | |
| 2002/0199189 A1* | 12/2002 | Prijatel | H04N 7/0884 |
| | | | 725/36 |
| 2005/0086692 A1* | 4/2005 | Dudkiewicz | H04N 21/84 |
| | | | 725/46 |
| 2005/0251827 A1 | 11/2005 | Ellis et al. | |
| 2010/0153885 A1 | 6/2010 | Yates | |
| 2013/0183021 A1* | 7/2013 | Osman | G07F 17/3216 |
| | | | 386/239 |
| 2014/0072275 A1* | 3/2014 | Nagasaka | H04N 21/8586 |
| | | | 386/230 |
| 2014/0245336 A1* | 8/2014 | Lewis, II | H04N 21/251 |
| | | | 725/14 |
| 2015/0150045 A1* | 5/2015 | Shovkoplias | H04N 21/44222 |
| | | | 725/34 |
| 2015/0172787 A1* | 6/2015 | Geramifard | H04N 21/8549 |
| | | | 725/40 |
| 2015/0319505 A1* | 11/2015 | Patadia | H04N 21/23614 |
| | | | 725/34 |
| 2015/0324841 A1* | 11/2015 | Pettit | H04N 21/44008 |
| | | | 705/14.49 |
| 2016/0150278 A1* | 5/2016 | Greene | H04N 21/6547 |
| | | | 725/28 |
| 2016/0249104 A1* | 8/2016 | Chung | H04N 21/47202 |
| 2017/0109585 A1* | 4/2017 | Matias | G06K 9/00751 |
| 2019/0130655 A1* | 5/2019 | Gupta | H04N 21/4126 |
| 2019/0349619 A1* | 11/2019 | Hou | H04N 21/251 |

\* cited by examiner

SYSTEM AND METHODS FOR SELECTING AND GENERATING PORTIONS OF A TARGET MEDIA ASSET FOR ADVERTISING THE TARGET MEDIA ASSET WHILE THE USER WATCHES A MEDIA ASSET

BACKGROUND

Related art systems are able to target advertisements to a given user based on his or her preferences. These systems customize what products or services are included in those based on each user's historical preference, and display that advertisement to the user at a predefined advertisement break during playback of a program. However, the content of these related art advertisements is static; it is pre-selected by an editor. Problematically, a product or service offered in the advertisement might be interesting, but the advertised aspect of the product or service in such a static advertisement may not include an attribute of the product or service that the user is attracted to, and thus a missed opportunity may occur due to the inflexibility of such systems.

SUMMARY

Accordingly, systems and methods are described for aggressively advertising media content to a user while the user is watching a media asset using attributes of the media asset for assistance. For example, while watching a media asset (the movie "Philadelphia"), a media guidance application may determine that "Tom Hanks" is the user's favorite actor. Therefore, the media guidance application may use this to advertise content related to "Tom Hanks" while the user is watching "Philadelphia". Additionally, the advertisement of target content is based on not just the fact that "Tom Hanks" features in the movie, but that "Tom Hanks" plays a role that is similar to the role that he plays in the movie "Philadelphia." The media guidance application may search every scene of the movie of the movie that the user is watching to determine an appropriate location to insert a segment of the target media asset. The media guidance application may insert multiple segments of the target media asset at different positions of the media asset to keep reminding the user about the target media asset.

In some aspects, the media guidance application may determine a prominent attribute of a first media asset that is being played back to a user. For example, the media guidance application may determine that a copy or rerun of the movie "Philadelphia" is being played back for a user. Using a profile associated with the user, based on past choices made by the user, the media guidance application may determine a prominent attribute of the movie "Philadelphia", to be the actor "Tom Hanks." In such examples, a prominent attribute may be a feature that stands out throughout the movie for the user. In some examples, the prominent attribute may be an attribute of the movie that the user may have a preference for liking the most.

Using this determined prominent attribute, the media guidance application may select a target media asset to advertise from a collection of candidate media assets. The media guidance application may select, from a plurality of candidate media assets for partial exposure to the user, a second media asset that features the prominent attribute of the first media asset. For example, the media guidance application may have a plurality of candidate media assets that are to be broadcast in the near future. For example, the media guidance application may determine that movies like "The Polar Express", "The Post", "Pacific Rim", and "The Avengers" will be played later on the same day as the user is watching "Philadelphia." The media guidance application, based on determining that the prominent attribute of the media asset the user is watching (e.g., "Philadelphia"), may select the movie "The Post" to advertise to the user as it also features the prominent attribute of "Philadelphia", the actor "Tom Hanks."

The media guidance application may determine an appropriate location in the first media asset to insert an advertisement. The media guidance application may determine an end to a first scene of the first media asset featuring the prominent attribute has occurred. For example, the media guidance application may determine from metadata related to the movie "Philadelphia", that a scene featuring "Tom Hanks" just ended. The media guidance application may end the scene featuring "Tom Hanks" when "Tom Hanks" leaves the scene, even if the scene does not end at that time.

The media guidance application, in response to determining the end to the first scene has occurred, may determine an additional second attribute of the scene. For example, the media guidance application may use a combination of the prominent attribute and the second attribute to select a first clip from the target media asset, "The Post" to display to the user. In such examples, the media guidance application may determine that a scene of the movie "Philadelphia" that was just generated for display to the user featured "Tom Hanks" sitting in a courtroom. In such examples, the media guidance application may determine the second attribute of the first scene to be a courtroom. The process of selection of the second attribute of the first scene may be similar to the selection of the prominent attribute of the first media asset.

Based on the prominent attribute and the additional second attribute, the media guidance application may now be able to display a clip from the target media asset "e.g., "The Post") that is similar to the first scene of the first media asset (e.g., "Philadelphia") that was just played back to the user. The media guidance application may determine a first segment of the second media asset featuring the prominent attribute and the second attribute. For example, the media guidance application may determine that the scene of the movie "Philadelphia" just displayed to the user involved a courtroom. The media guidance application may search through the scenes of the movie "The Post" to determine a scene that also involves "Tom Hanks" in a courtroom.

The media guidance application may pause the display of the first media asset to display a scene of the target media asset. The media guidance application may play back the first segment of the second media asset, and resume playback of the first media asset. For example, the media guidance application may insert commercial breaks in the first media asset to display portions of the second media asset to promote the second media asset. In such examples, the media guidance application exposes the user to a scene from the movie "The Post" similar to a scene from the movie "Philadelphia" provided to the user to aggressively promote the movie "The Post."

The media guidance application may provide a second clip from the second media asset (e.g., "The Post") after the first clip from the same movie at a different time. The media guidance application may determine, during the resumed playback of the first media asset, that an end to a second scene of the first media asset featuring the prominent attribute has occurred. For example, while the media guidance application plays back the movie "Philadelphia" to the user, the media guidance application may determine that a second scene featuring the prominent attribute "Tom Hanks" has just ended. As described, the media guidance application may determine an end time of the scene using metadata associated with the movie, or may put an end to the scene when the prominent attribute "Tom Hanks" leaves the frame.

The media guidance application, in response to determining the end to the second scene has occurred, may determine an additional third attribute of the scene. For example, the media guidance application may use a combination of the prominent attribute and the additional third attribute to select a second clip from the target media asset, "The Post" to display to the user. In such examples, the media guidance application may determine that second scene of the movie "Philadelphia" that was just displayed to the user featured "Tom Hanks" celebrating at a party. In such examples, the media guidance application may determine the additional third attribute of the first scene to be a party. The process of selection of the third attribute of the first scene may be similar to the selection of the prominent attribute of the first media asset.

Based on the prominent attribute and the third attribute, the media guidance application may now be able to display a clip from the target media asset "e.g., "The Post") that is similar to the second scene of the first media asset (e.g., "Philadelphia") that was just played back to the user. The media guidance application may determine a second segment of the second media asset featuring the prominent attribute and the second attribute. For example, the media guidance application may determine that the scene of the movie "Philadelphia" just displayed to the user involved a party. The media guidance application may search through the scenes of the movie "The Post" to determine a scene that also involves "Tom Hanks" in a party.

The media guidance application may pause the display of the first media asset to display a second scene of the target media asset. The media guidance application may play back the second segment of the second media asset, and resume playback of the first media asset. For example, the media guidance application may insert commercial breaks in the first media asset to display portions of the second media asset to promote the second media asset. In such examples, the media guidance application exposes the user to a second scene from the movie "The Post" similar to a scene from the movie "Philadelphia" provided to the user to aggressively promote the movie "The Post."

As the media guidance application is looking for the prominent attribute in any scene of the first media asset, the media guidance application may decide to identify scenes of the first media asset in a way that is different from the way metadata associated with the first media asset identifies the scenes. In some embodiments, the media guidance application may determine from metadata associated with the first media asset, an end time of the first scene. For example, while watching the first media asset "Philadelphia", the media guidance application may determine from metadata associated with the movie that the courtroom scene that is being displayed ends after an actor (e.g., "Denzel Washington") completes his speech. In some examples, the media guidance application may extract from the metadata, a timestamp identifying an end time associated with the scene that the media guidance application is generating for display.

The media guidance application may determine a second time, that is earlier than the end time, in the first scene at which the prominent attribute is no longer part of the first scene. For example, the media guidance application, may determine that during the courtroom scene that is being displayed, the prominent attribute "Tom Hanks" walks out of the courtroom while the actor "Denzel Washington" is in the middle of his speech. The media guidance application may determine that the absence of the prominent attribute signals an end to the scene, even if the speech from the actor "Denzel Washington" is in progress. Based on this information, the media guidance application may change the end time of the first scene to the second time.

Based on the change in end time of the first scene of the first media asset, the media guidance application may change the display time of the first clip to be displayed in the second media asset. In some embodiments, the media guidance application determines supplemental content that is to be played back at the end time, wherein the supplemental content includes the first segment of the second media asset. For example, the media guidance application may display a commercial of the target media asset, "The Post", at the end of the first scene. In some embodiments, the commercial may include a first segment of "The Post" that is similar to the scene of the movie "Philadelphia" provided to the user.

The media guidance application may determine whether the end time has changed and in response to determining that the end time has changed, the media guidance application plays back the supplemental content at the second time in the first media asset. For example, the media guidance application may at the new changed time, pause the playback of movie "Philadelphia" that the user is watching and play a first clip of the movie "The Post."

In order to determine a prominent attribute of the first media asset ("Philadelphia"), the media guidance application looks for attributes in the first media asset that are preferred by the user. In some embodiments, the media guidance application determines from a profile of the user, a set of attributes desirable to the user. For example, the media guidance application may analyze a profile associated with the user to extract media attributes that are preferred by the user. The media attributes may be collected by analyzing actions of the user over time. In such examples, the media guidance application may determine that the user has a preference for "drama", "thrillers", "Tom Hanks", "Meryl Streep", etc.

The media guidance application may compare each attribute in the set of attributes to metadata describing the first media asset. For example, the media guidance application may determine whether each attribute in the set of attributes is present in the movie "Philadelphia." In such examples, the media guidance application may determine that the attributes "drama," "Tom Hanks," and "thrillers" are present in the movie, but "Meryl Streep" is not present in the movie.

The media guidance application may determine, from the comparison a respective amount of presence of each attribute in the set of attributes in the first media asset. For example, the media guidance application may determine that the amount of "drama" in the movie by measuring a length of each scene in the first media asset that has a metadata tag of "drama" associated with it.

The media guidance application may measure an amount of each attribute present in the first media asset that coincides with attributes preferred by the user. The media guidance application may select as the prominent attribute from the set of attributes, a first attribute with a highest respective amount of presence in the first media asset. For example, from the metadata of the movie "Philadelphia", the media guidance application may measure a presence of attributes preferred by the user like "drama," "thriller," and "Tom Hanks." The media guidance application may measure an appearance of "Tom Hanks" in the movie at 75% of the movie, and attribute "drama" may be measured at 65% and "thriller" may be measured at 45%. Based on the measurement, the media guidance application may select "Tom Hanks" as the prominent attribute of the first media asset "Philadelphia."

Similarly, the media guidance application determines an additional second media attribute of a particular scene of the first media asset "Philadelphia" that the user is watching at a particular time. The media guidance application may compare each attribute in the set of attributes to metadata describing the first scene of the first media asset. For example, the media guidance application may in a first scene of the movie "Philadelphia", determine a presence of attributes preferred by the user like, "Tom Hanks," "drama," and "thriller."

The media guidance application may determine, from the comparison a respective amount of presence of each attribute in the set of attributes in the first scene, and select as the second attribute from the set of attributes, a second attribute with a highest respective amount of presence in the first scene of the first media asset. For example, the media guidance application may measure an appearance of "Tom Hanks" in the scene at 45% of the scene, and attribute "courtroom" may be measured at 95% and "thriller" may be measured at 35%. Based on the measurement, the media guidance application may select "courtroom" as the additional second attribute of the first media asset "Philadelphia."

With the prominent and the additional second attribute, the media guidance application may now determine a segment from the second media asset to advertise in the middle of the first media asset. In some embodiments, the media guidance application may search through metadata associated with each scene of the second media asset to extract a set of tags that identify themes in the respective scene. For example, the media guidance application may divide the second media asset into a plurality of scenes and from metadata associated with the second media asset, a set of tags that identify a theme for each scene. For example, some of the tags that may be used to identify themes of a scene are "character development," "climax," "fight," "build-up." The media guidance application may compare the extracted set of tags to a plurality of entries, wherein each entry in the plurality of entries maps at least one tag to a respective event identifier. In such examples, media guidance application may map some metadata tags related to scenes of the second media assets to event identifiers such as "climax," "fight," "comic relief," "introduction," and "plot twist." Based on the metadata associated with the second media asset, the media guidance application may group scenes that are associated with the same event identifier tag. For example, all climax scenes may be grouped together, all comic relief scenes may be grouped together and all plot twist scenes may be grouped together.

The media guidance application may further process the scenes to generate segments that may be used as advertisements in the first media asset. The media guidance application determines whether the same respective identifier is pivotal. For example, the media guidance application may classify certain event identifiers as pivotal. In such examples, identifiers such as "climax," "plot twist," and "fight," may be defined as pivotal. A pivotal event may be identified as a significant event in the movie. In some embodiments, in response determining that the same respective event identifier is pivotal, the media guidance application identifies a timestamp of the respective pivotal event in each scene in the first plurality of scenes. For each scene in the plurality of scenes, the media guidance application may determine a timestamp associated with the actual pivotal event and generates a segment in a plurality of segments, that includes a portion of the respective scene and excludes the pivotal event. For example, the media guidance application may determine, in a first scene of the plurality of scenes, a time at which the pivotal event occurred. In such examples, the pivotal event in a scene may be an important dialogue, or the result of a fight, or the ending of a scene. The media guidance application may remove the pivotal event from the scene to avoid spoilers, and generate an advertisement segment from the scene. In this example, the first segment does not give away important plot details of the second media asset.

From the plurality of events with pivotal events, the media guidance application may select a segment that has the largest presence of the prominent attribute. In some embodiments, for each segment in the plurality of segments, the media guidance application may determine a respective amount of presence of the prominent attribute, and based on the determining, selects as the first segment from the plurality of segments, a segment that has a respective highest amount of presence of the prominent attribute.

In generating multiple advertisements of the target media asset, the media guidance application may also attempt to relate the second segment to the first segment of the second media asset. In some embodiments, the media guidance application determines a first scene corresponding to the first segment, extracts a second set of tags related to the first scene from the first set of tags related to the second media asset, compares the extracted second set of tags to a second plurality of entries, where each entry in the second plurality of entries includes at least one tag and an related scene identifier; and based on the comparison, determines a second scene related to the first scene in the second media asset. For example, the media guidance application may determine the first segment is related to the "courtroom" scene. From the metadata associated with the first scene, the media guidance application may determine that the first scene of the "courtroom" is related to the second scene of the "party".

From the second scene, the media guidance application may determine the second segment to be displayed to the user. In some embodiments, the media guidance application searches in the plurality of segments, for a second segment based on the second scene, and based on the searching, selecting the second segment for display, from the first plurality of segments, that is related to the first segment.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for aggressively advertising target media content to a user while the user is watching a media asset using attributes of the media asset for assistance. In some embodiments, aggressive advertising is different from normal advertising as aggressive advertising involves displaying multiple different clips of the same media asset customized to the preferences of the user. In such embodiments, aggressive advertising may include inserting different clips of the target media asset at different locations of the media asset the user is watching. In such embodiments, the determination of the clips of the target media asset, to be inserted, is based on the portion of the media asset the user is watching. For example, while the user is watching a media asset (e.g., the movie "Philadelphia"), a media guidance application may determine that "Tom Hanks" is the user's favorite actor. Therefore, the media guidance application may use this to promote content related to "Tom Hanks" while the user is watching "Philadelphia". However, the advertisement of target content is based not just on the fact that "Tom Hanks" features in the movie, but that "Tom Hanks" plays a role that is similar to the role that he plays in the movie "Philadelphia". The media guidance application, may search every scene of the media asset that the user is watching to determine an appropriate location to insert a segment of the target media asset. The media guidance application may insert multiple segments of the target media asset at different positions of the media asset.

Figure 1:
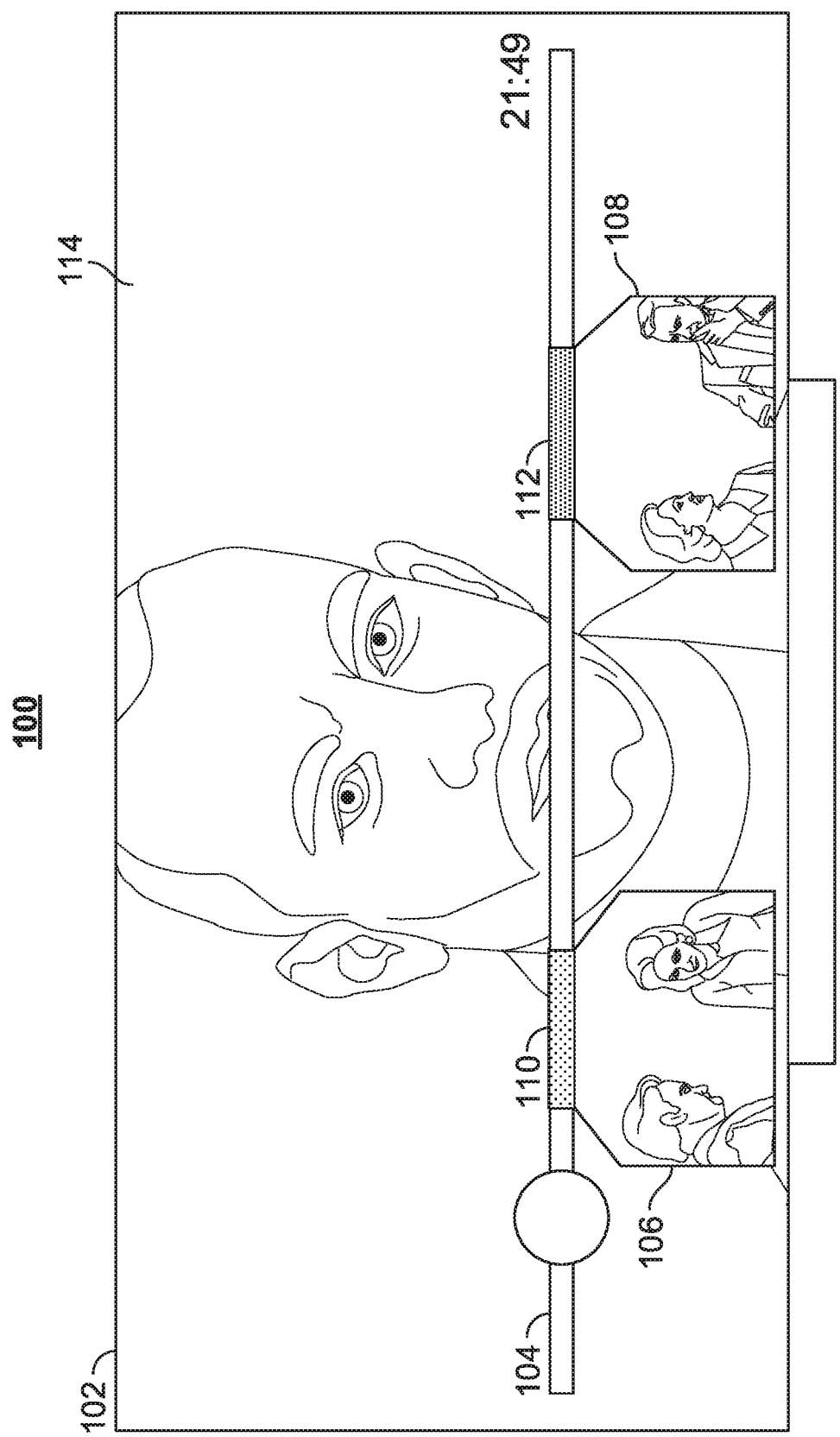
FIG. 1 shows an illustrative example of aggressive advertisement of media content, in accordance with some embodiments of the disclosure.

FIG. 1 shows an illustrative example of aggressive advertisement of media content, in accordance with some embodiments of the disclosure. FIG. 1 shows a user equipment device 102 that is displaying a first media asset 114. The media guidance application may receive a command from a user to play a first media asset 114. In playing back the first media asset 114, the media guidance application may display a progress bar 104 that indicates an amount of the first media asset 114 the user has consumed. In progress bar 104, the media guidance application may also indicate where the target media asset may be inserted in the playback of the media asset 114. Locations 110 and 112 depict a shading of a progress bar that depicts that a different media asset may be displayed during the first media asset 114 at that time. In some embodiments, when the user hovers over a portion of the progress bar 104, the media guidance application may display a thumbnail of the portion of the first media asset 114 or a target media asset that is to be played at that point. Upon receiving a command from a user to hover over the shaded regions 110 and 112, the media guidance application may display a thumbnail 106 and 108 of a portion of the target media content for display. In some embodiments, the portions 106 and 108 may be different portions of the target media asset. In some embodiments, portions 106 and 108 may depict a commercial break that includes a portion of the target media asset that is to be advertised to the user.

For example, as shown in FIG. 1, the user may begin watching the first media asset 114 (e.g., a copy of the movie "Philadelphia"). The first media asset 114 may have metadata associated with the first media asset 114 that includes attributes that indicate features of the first media asset 114. In some embodiments, the media guidance application may determine a prominent attribute of the first media asset 114 that is being played back to a user. Of the many attributes of the first media asset 114, the media guidance application may determine a prominent attribute of the first media asset 114 using a profile associated with the user. The user profile may include past choices and any preferences recorded by the user. Based on the user profile, the media guidance application may determine a prominent attribute of the first media asset 114, to be the actor "Tom Hanks". In such examples, a prominent attribute may be a prominent feature of the first media asset 114 that stands out throughout the movie for the user. In some examples, the prominent attribute may be an attribute present in the user profile that has a highest presence in the first media asset 114.

In order to determine a prominent attribute of the first media asset 114, the media guidance application looks for attributes in the first media asset 114 that are preferred by the user. In some embodiments, the media guidance application determines from a profile of the user, a set of attributes desirable to the user. For example, the media guidance application may analyze a profile associated with the user to extract media attributes that are preferred by the user. The media attributes may be collected by analyzing actions of the user over time. In some embodiments, the media attributes desirable to the user may be determined from a watch history of the user over a period of time. In such examples, the media guidance application may determine that the user has a preference for "drama", "thrillers", "Tom Hanks", "Meryl Streep", etc.

Using attributes from the user profile, the media guidance application may determine a prominent attribute of the first media asset 114. The media guidance application may extract, a plurality of entries of a database that include metadata associated with each scene of the first media asset 114. In some embodiments, the plurality of entries divides the first media 114 into a plurality of scenes. In some embodiments, the media guidance application may indicate a time stamp indicating the time at which each scene in the first plurality of scenes of the first media asset 114 begins and ends. In some embodiments, the plurality of entries may relate each scene in the plurality of scenes to other scenes in the first media asset 114. In some embodiments, all the scenes of the first media asset 114 that feature an actor may be related to one another. In some embodiments, the plurality of entries in the metadata may include tags that identify a purpose of theme of a scene. For example, the plurality of entries may indicate a first scene of the first media asset 114 is a "climax," "spoiler," or "character development" etc. In some embodiments, scenes of the first media asset 114 with certain tags like "spoiler" and "climax" may be linked to one another.

The media guidance application may compare each attribute in the set of attributes to the metadata describing the first media asset 114. For example, the media guidance application may determine whether each attribute in the set of attributes is present in the first media asset 114. In such examples, the media guidance application may compare the attributes of the user profile to attributes associated with the first media asset 114 to determine that the attributes "drama," "Tom Hanks," and "thrillers" are present in the movie, but "Meryl Streep" is not present in the first media asset 114. The media guidance application may determine, from the comparison a respective amount of presence of each attribute in the set of attributes in the first media asset 114. For example, the media guidance application may determine that the amount of "drama" in the first media asset 114 by measuring a length of each scene in the first media asset 114 that has a metadata tag of "drama" associated with it.

The media guidance application may measure an amount of each attribute present in the first media asset 114 that coincides with attributes preferred by the user. The media guidance application may select as the prominent attribute from the set of attributes, a first attribute with a first highest respective amount of presence. For example, from the metadata of the first media asset 114 (e.g., "Philadelphia") the media guidance application may measure a presence of attributes preferred by the user like "drama," "thriller," and "Tom Hanks." The media guidance application may measure an appearance of "Tom Hanks" in the movie at 75% of the movie, and attribute "drama" may be measured at 65% and "thriller" may be measured at 45%. Based on the measurement, the media guidance application may select "Tom Hanks" as the prominent attribute of the first media asset 114 ("Philadelphia").

Using this determined prominent attribute, the media guidance application may select a target media asset to advertise from a collection of candidate media assets. The media guidance application may select, from a plurality of candidate media assets for partial exposure to the user, a second media asset that features the prominent attribute of the first media asset. In some embodiments, candidate media assets may be media assets that are to be broadcast in the near future. For example, the media guidance application may determine a plurality of candidate media assets that are to be broadcast in a particular day including "The Polar Express," "The Post," "Pacific Rim," and "The Avengers." The media guidance application, based on determining that the prominent attribute of the first media asset 114 the user is watching (e.g., "Philadelphia"), may select the movie "The Post" to advertise to the user as it also features the prominent attribute of the first media asset 114, the actor "Tom Hanks." In some embodiments, a partial exposure may involve providing the user only a glimpse of the target media asset that will peak the user's interest in watching the target media asset. In some embodiments, the glimpse of the target media asset may include a small portion of the target media asset determined to be similar to a portion of the media asset the user is watching. In some embodiments, the media guidance application may determine multiple such portions similar to different scenes of the target media assets and provide the user the portions right after the relevant scenes in the media asset the user is viewing.

Similarly, the media guidance application determines an additional second media attribute of a particular scene of the first media asset 114 ("Philadelphia") that is being played back for the user at a particular time. The media guidance application may compare each attribute in the set of attributes preferred to the user, to metadata describing the first scene of the first media asset 114. For example, the media guidance application may in a first scene of the first media asset 114 ("Philadelphia"), determine a presence of attributes preferred by the user like, "Tom Hanks," "courtroom," and "thriller."

The media guidance application may determine, from the comparison a different respective amount of presence of each attribute in the set of attributes in the first scene, and select as the second attribute from the set of attributes, a second attribute with a second highest respective amount of presence, different from the first highest respective amount of presence. For example, the media guidance application may measure an appearance of "Tom Hanks" in the scene at 45% of the scene, and attribute "courtroom" may be measured at 95% and "thriller" may be measured at 35%. Based on the measurement, the media guidance application may select "courtroom" as the additional second attribute of the first media asset 114 ("Philadelphia").

With the prominent and the additional second attribute, the media guidance application may now determine a segment from the target media asset ("The Post") to advertise in between the first media asset 114. In some embodiments, the media guidance application may search through metadata associated with each scene of the target media asset to extract a first set of tags that identify themes in the respective scene. For example, the media guidance application may divide the target media asset into a plurality of scenes and from metadata associated with the target media asset, a first set of tags that identify a theme for each scene. For example, some of the tags that may be used to identify themes of a scene are "character development," "climax," "fight," "build-up." The media guidance application may compare the extracted set of tags to a plurality of entries, wherein each entry in the plurality of entries maps at least one tag to a respective event identifier. In such examples, media guidance application may map some metadata tags related to scenes of the second media assets to event identifiers such as "climax," "fight," "comic relief," "introduction," and "plot twist." Based on the metadata associated with the second media asset, the media guidance application may group scenes that are associated with the same event identifier tag. For example, all climax scenes may be grouped together, all comic relief scenes may be grouped together and all plot twist scenes may be grouped together.

The media guidance application may further process the scenes to generate segments that may be used as advertisements in the first media asset. The media guidance application determines whether the same respective identifier is pivotal. For example, the media guidance application may classify certain event identifiers as pivotal. In such examples, identifiers such as "climax," "plot twist," and "fight," may be defined as pivotal. A pivotal event may be identified as a significant event in the movie. In some embodiments, the media guidance application may classify events as pivotal based on their location in a media asset. For example, a "fight" scene towards the end of the movie may be determined as pivotal, but a different fight scene in the middle of the movie may not be pivotal. In some embodiments, the media guidance application may receive an input from the user indicating a set of events as pivotal. In some embodiments, the media guidance application may search through the internet to determine which events in a particular media asset are pivotal. In such embodiments, searching through the internet may involve parsing through the reviews of the media asset determining, from the parsing, events that of the media asset that should be designated as pivotal. In some embodiments, some of the events such as the "climax" and "plot-twists" may always be treated as pivotal events.

In some embodiments, in response determining that the same respective event identifier is pivotal, the media guidance application identifies a timestamp of the respective pivotal event in each scene in the first plurality of scenes. For each scene in the plurality of scenes, the media guidance application may determine a timestamp associated with the actual pivotal event and generates a segment in a plurality of segments, that includes a portion of the respective scene and excludes the pivotal event. For example, in a pivotal fight scene, the pivotal event from the perspective of the story, may be the end of the fight to determine which of the participants won the fight. The media guidance application may determine, in a first scene of the plurality of scenes, a time at which the pivotal event (e.g., "end of the fight") occurred. In some examples, the pivotal event in a scene may be an important dialogue, or the ending of a scene. The media guidance application may remove the pivotal event from the scene to avoid spoilers, and generate an advertisement segment from the scene. In this example, the first segment does not give away important plot details of the second media asset. In such example, the media guidance application may cut the pivotal event out of the scene to generate a segment that is interesting but does not spoil the media asset for the user.

From the plurality of events with pivotal events, the media guidance application may select a segment that has the largest presence of the prominent attribute. In some embodiments, for each segment in the plurality of segments, the media guidance application may determine a respective amount of presence of the prominent attribute, and based on the determining, selects as the first segment from the plurality of segments, a segment that has a respective highest amount of presence of the prominent attribute.

The media guidance application may also attempt to relate the second segment to the first segment of the second media asset. In some embodiments, the media guidance application determines a first scene corresponding to the first segment, extracts a second set of tags related to the first scene from the first set of tags related to the second media asset, compares the extracted second set of tags to a second plurality of entries, where each entry in the second plurality of entries includes at least one tag and an related scene identifier; and determines a second scene related to the first scene in the second media asset. For example, the media guidance application may determine the first segment is related to the "courtroom" scene. From the metadata associated with the first scene, the media guidance application may determine that the first scene of the "courtroom" is related to the second scene "party".

From the second scene, the media guidance application may determine the second segment to be displayed to the user. In some embodiments, the media guidance application searches in the first plurality of segments, for a second segment based on the second scene, and based on the searching, selecting the second segment for display, from the first plurality of segments, that is related to the first segment.

As the media guidance application is looking for the prominent attribute in any scene of the first media asset 114, the media guidance application may decide to identify scenes of the first media asset in a way that is different from the way metadata associated with the first media asset identifies the scenes. In some embodiments, the media guidance application may determine from metadata associated with the first media asset, an end time of the first scene. For example, while watching the first media asset 114 (e.g., "Philadelphia"), the media guidance application may determine from metadata associated with the movie that the courtroom scene that is being displayed ends after an actor (e.g., "Denzel Washington") completes his speech. In some examples, the media guidance application may extract from the metadata, a timestamp identifying an end time associated with the scene that the media guidance application is generating for display.

The media guidance application may determine a second time, that is earlier than the end time, in the first scene at which the prominent attribute is no longer part of the first scene. For example, the media guidance application, may determine that during the courtroom scene that is being displayed, the prominent attribute "Tom Hanks" walks out of the courtroom while the actor "Denzel Washington" is in the middle of his speech. The media guidance application may determine that the absence of the prominent attribute signals an end to the scene, even if the speech from the actor "Denzel Washington" is in progress. Based on this information, the media guidance application may change the end time of the first scene to the second time. In such examples, the media guidance application may change the end time of the scene in the metadata associated with the second media asset.

Based on the change in end time of the first scene of the first media asset, the media guidance application may change the display time of the first clip to be displayed in the second media asset. In some embodiments, the media guidance application determines supplemental content that is to be played back at the end time, wherein the supplemental content includes the first segment of the second media asset. For example, the media guidance application may display a commercial of the target media asset, "The Post", at the end of the first scene.

In some embodiments, the supplemental content may include a commercial that displays a first segment of "The Post" that is similar to the scene of the movie "Philadelphia" provided to the user. In some embodiments supplemental content may include the first segment of "The Post" and other advertisements.

The media guidance application may determine whether the end time has changed and in response to determining that the end time has changed, the media guidance application plays back the target media asset at the second time in the first media asset. For example, the media guidance application may at the new changed time, pause the playback of movie "Philadelphia" that the user is watching and play a first clip of the movie "The Post".

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
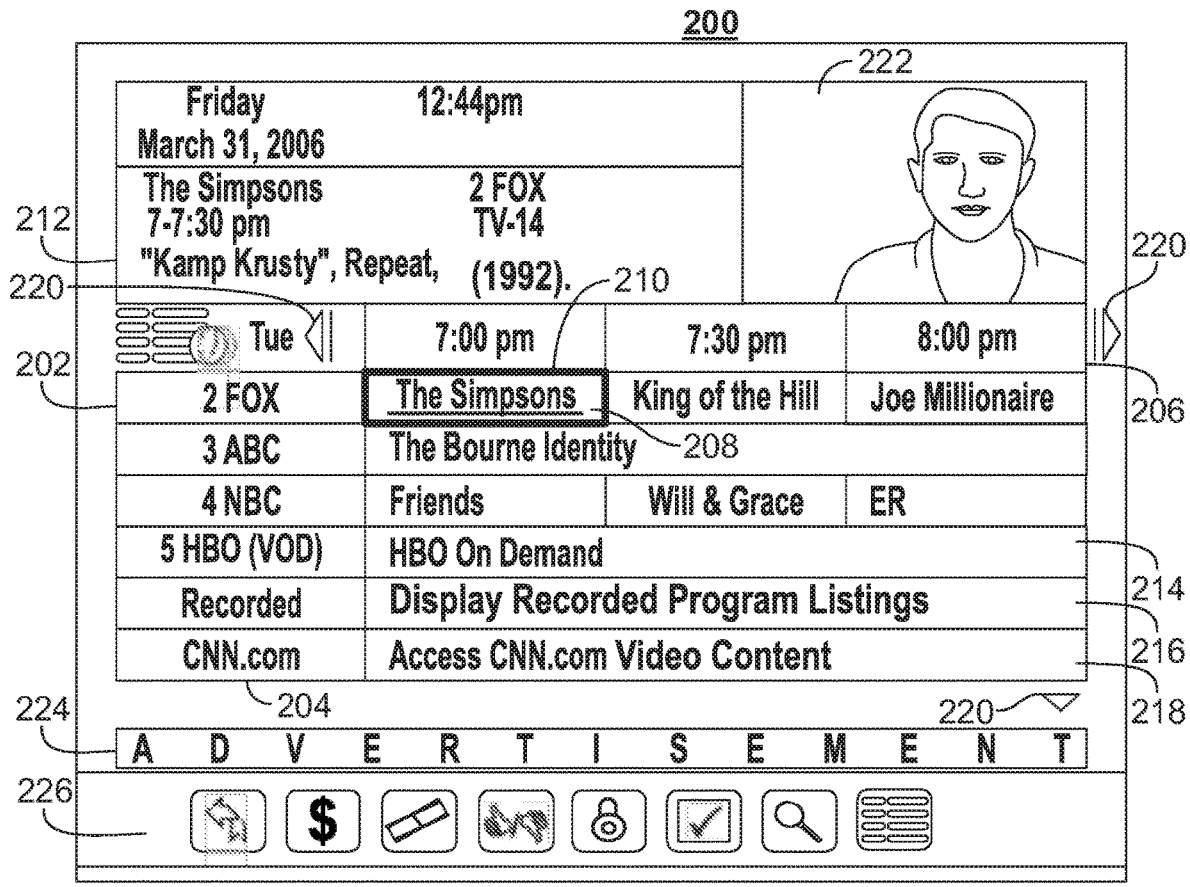
FIG. 2 shows an illustrative embodiment of a display screen that may be used to provide media guidance application listings and other media guidance information, in accordance with some embodiments of the disclosure.
Figure 3:
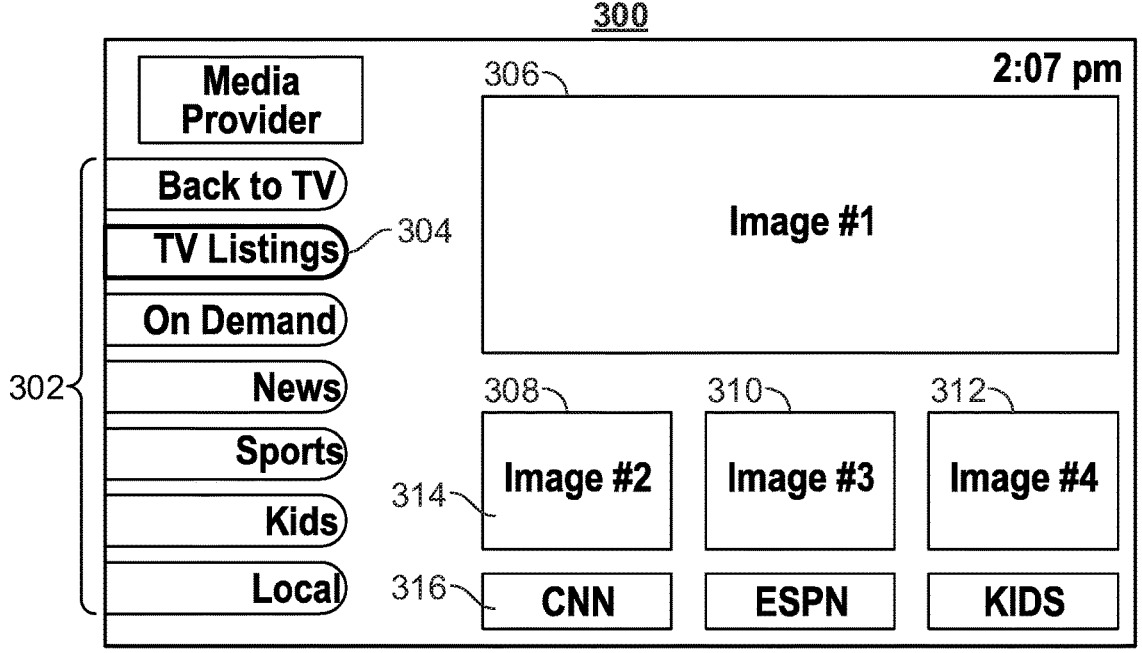
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
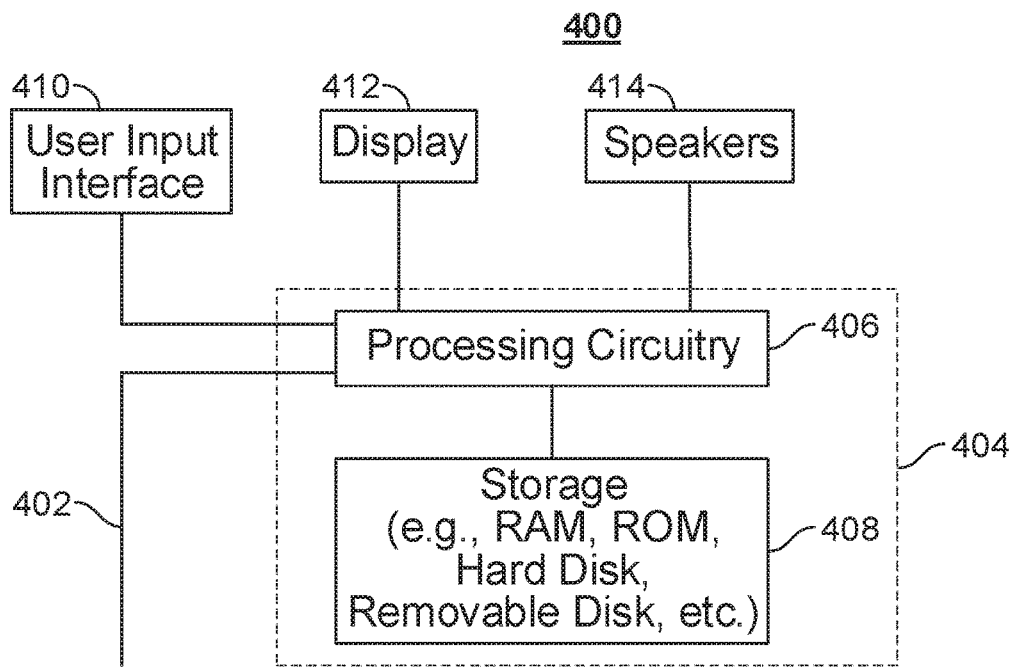
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
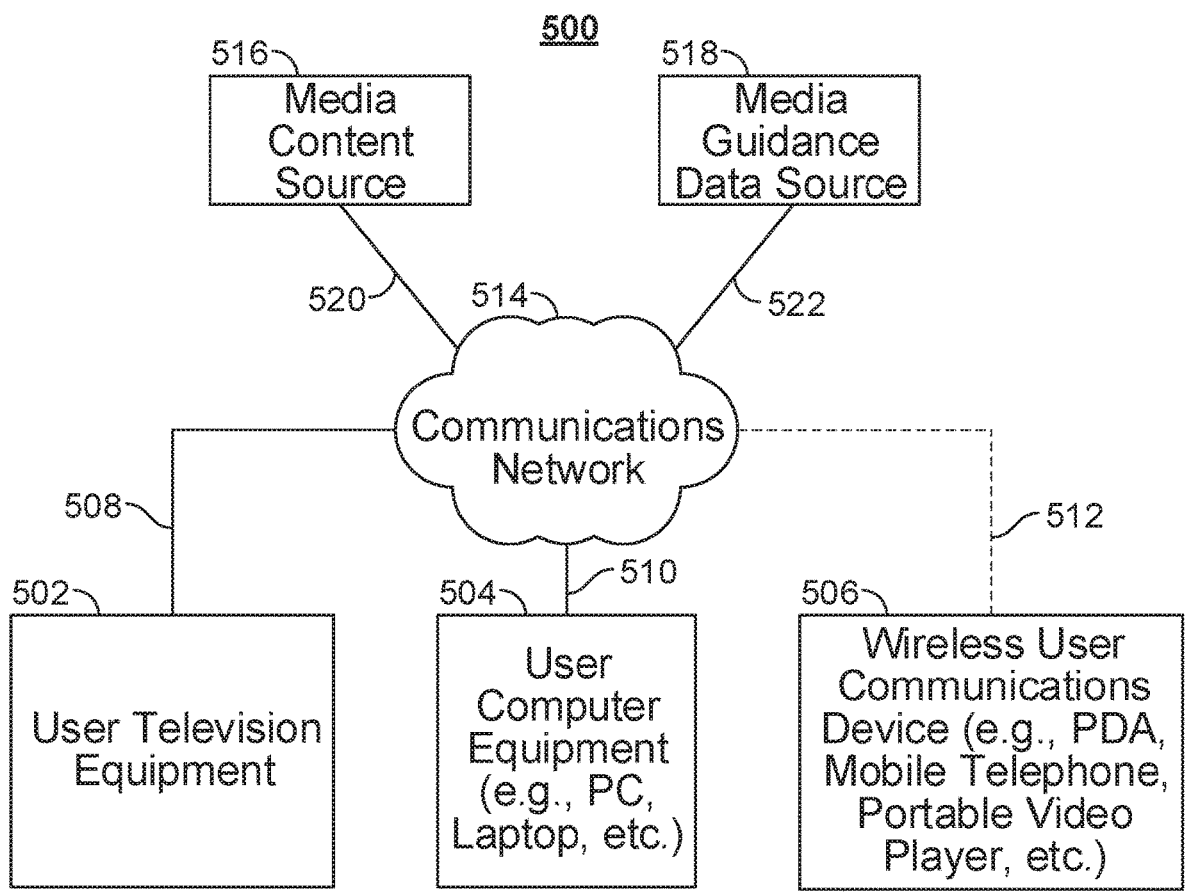
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
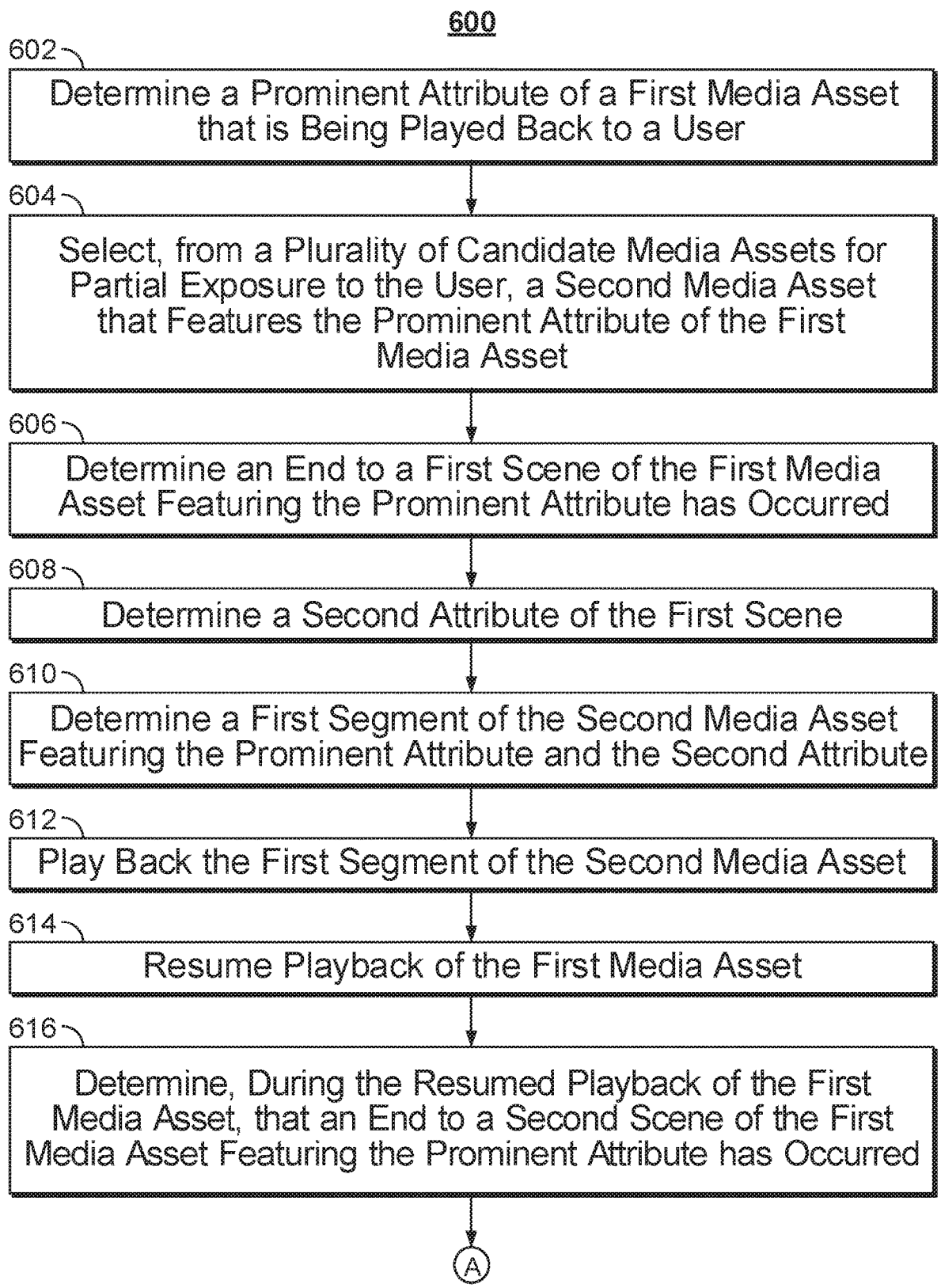
FIG. 6 is a flowchart of a detailed illustrative process for aggressive advertisement of media content, in accordance with some embodiments of the disclosure.
Figure 6:
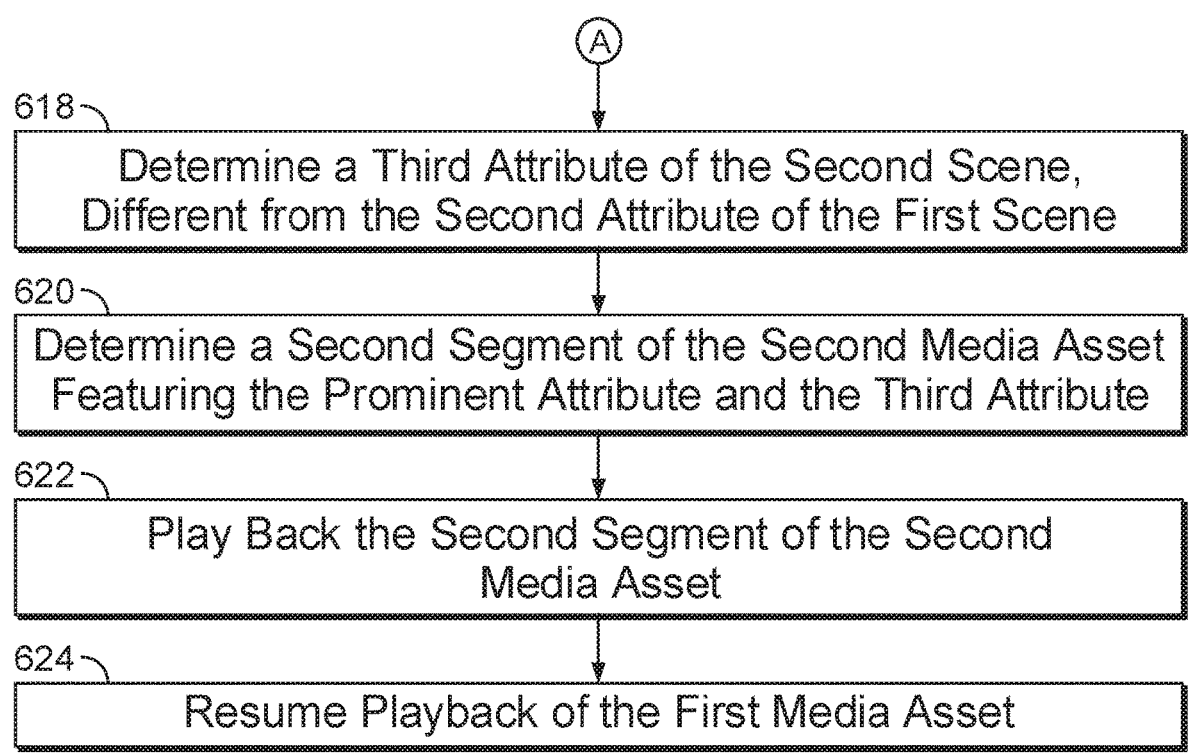

FIG. 6 is a flowchart of a detailed illustrative process for aggressive advertisement of media content, in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 600 may be incorporated into or combined with one or more steps of any other process or embodiment (e.g., as described in relation to FIGS. 7-10). Many elements of process 600 have been described above with respect to FIG. 1, and those descriptions have full force and effect with respect to the below description of process 600, and thus details on previously-described elements are omitted for the sake of brevity.

Process 600 begins at 602 where control circuitry 404 determines a prominent attribute of a first media asset 114 that is being played back to a user on a display 412 of user equipment device 102. At 604, control circuitry 404 selects, from a plurality of candidate media assets stored in storage 408, for partial exposure to the user, a second media asset that features the prominent attribute of the first media asset. At 606, control circuitry 404 determines an end to a first scene of the first media asset 114 featuring the prominent attribute has occurred. At 608, control circuitry 404 determines, from metadata stored at storage 408, a second attribute of the first scene. At 610, control circuitry 404 determines a first segment of the second media asset featuring the prominent attribute and the second attribute. At 612, control circuitry 404 plays back the first segment of the second media asset 114 on display 412 of user equipment device 102. At 614, control circuitry 404 resumes playback of the first media asset on display 412 of user equipment device 102. At 616, control circuitry determines, during the resumed playback of the first media asset 114 on display 412 of user equipment device 102, that an end to a second scene of the first media asset 114 featuring the prominent attribute has occurred. At 618, control circuitry 404 determines a third attribute of the second scene from metadata stored at storage 408, different from the second attribute of the first scene. At 620, control circuitry 404 determines a second segment of the second media asset featuring the prominent attribute and the third attribute. At 622, control circuitry 404 plays back the second segment of the second media asset on display 412 of user equipment device 102. At 624, control circuitry 404 resumes playback of the first media asset 114 on display 412 of user equipment device 102.

Figure 7:
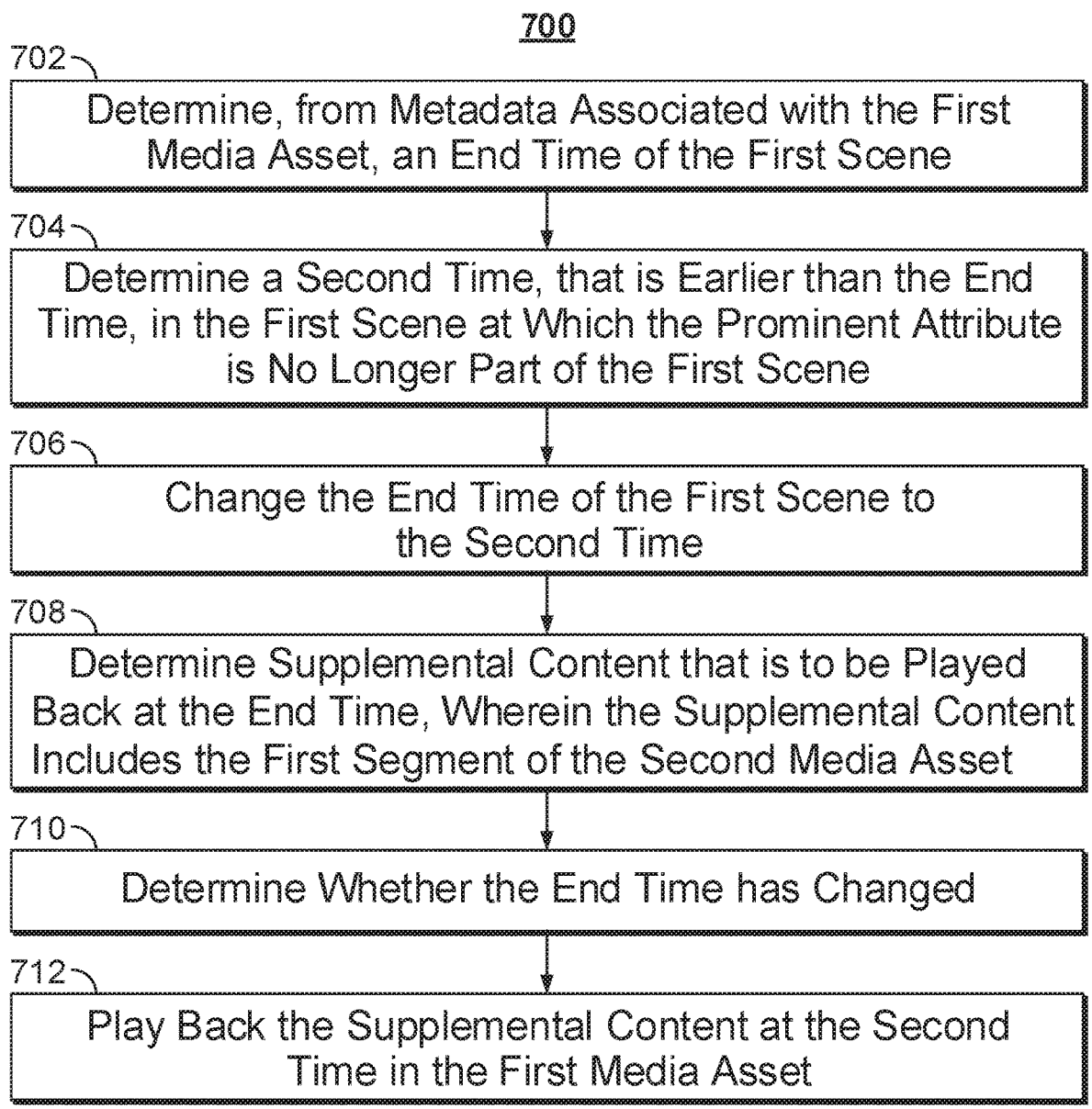
FIG. 7 is a flowchart of a detailed illustrative process for determining an appropriate position to insert a commercial in the first media asset, in accordance with some embodiments of the disclosure.

FIG. 7 is a flowchart of a detailed illustrative process for determining an appropriate position to insert a commercial in the first media asset, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 700 may be incorporated into or combined with one or more steps of any other process or embodiment (e.g., as described in relation to FIGS. 6 and 8-10). Many elements of process 700 have been described above with respect to FIG. 1, and those descriptions have full force and effect with respect to the below description of process 700, and thus details on previously-described elements are omitted for the sake of brevity.

Process 700 begins at 702 where control circuitry 404 determines, from metadata stored at storage 404 associated with the first media asset 114, an end time of the first scene. At 704, control circuitry determines a second time, that is earlier than the end time, in the first scene at which the prominent attribute is no longer part of the first scene. At 706, control circuitry 404 changes the end time of the first scene to the second time. At 708, control circuitry 404 determines supplemental content that is to be played back at the end time at display 412 of use equipment device 102, wherein the supplemental content includes the first segment of the second media asset. At 710, control circuitry 404 determines whether the end time has changed. At 712, control circuitry 404 plays play back the supplemental content at the second time in the first media asset on display 412 of user equipment device 102.

Figure 8:
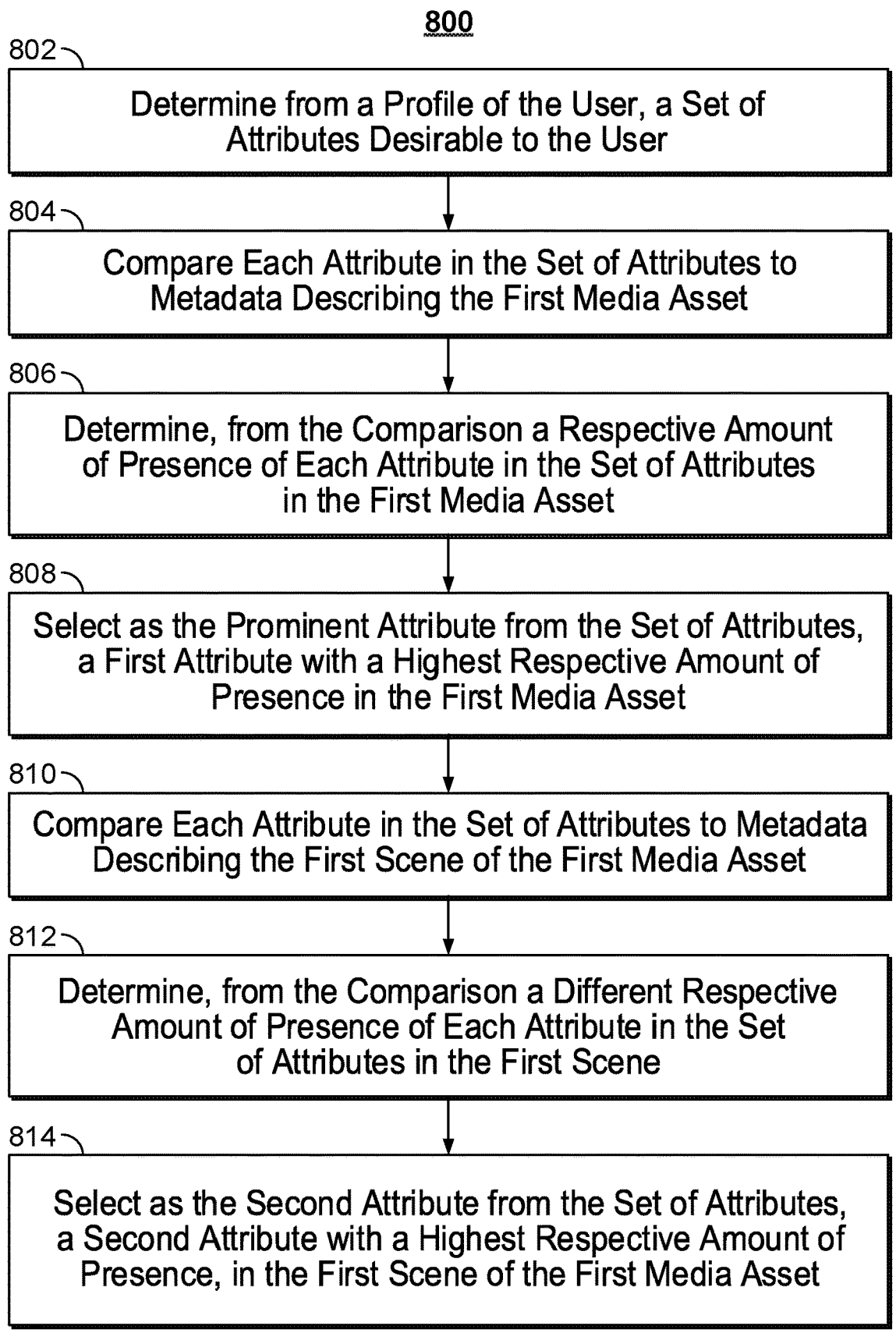
FIG. 8 is a flowchart of a detailed illustrative process for determining a prominent attribute and a second attribute of the first media asset, in accordance with some embodiments of the disclosure.

FIG. 8 is a flowchart of a detailed illustrative process for determining a prominent attribute and a second attribute of the first media asset, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 800 may be incorporated into or combined with one or more steps of any other process or embodiment (e.g., as described in relation to FIGS. 6-7 and 9-10). Many elements of process 800 have been described above with respect to FIG. 1, and those descriptions have full force and effect with respect to the below description of process 800, and thus details on previously-described elements are omitted for the sake of brevity.

Process 800 starts at 802, where control circuitry 404 determines from a profile of the user, at storage 408, a set of attributes desirable to the user. At 804, control circuitry 404 compares each attribute in the set of attributes to metadata describing the first media asset 114. At 806, control circuitry 404 determines, from the comparison a respective amount of presence of each attribute in the set of attributes in the first media asset. At 808, control circuitry 404 selects as the prominent attribute from the set of attributes, a first attribute with a highest respective amount of presence in the first media asset. At 810, control circuitry 404 compares each attribute in the set of attributes to metadata, stored at storage 408 describing the first scene of the first media asset. At 812, control circuitry 404 determines, from the comparison a different respective amount of presence of each attribute in the set of attributes in the first scene. At 814, control circuitry 404 selects as the second attribute from the set of attributes, stored at storage 408, a second attribute with a highest respective amount of presence, in the first scene of the first media asset.

Figure 9:
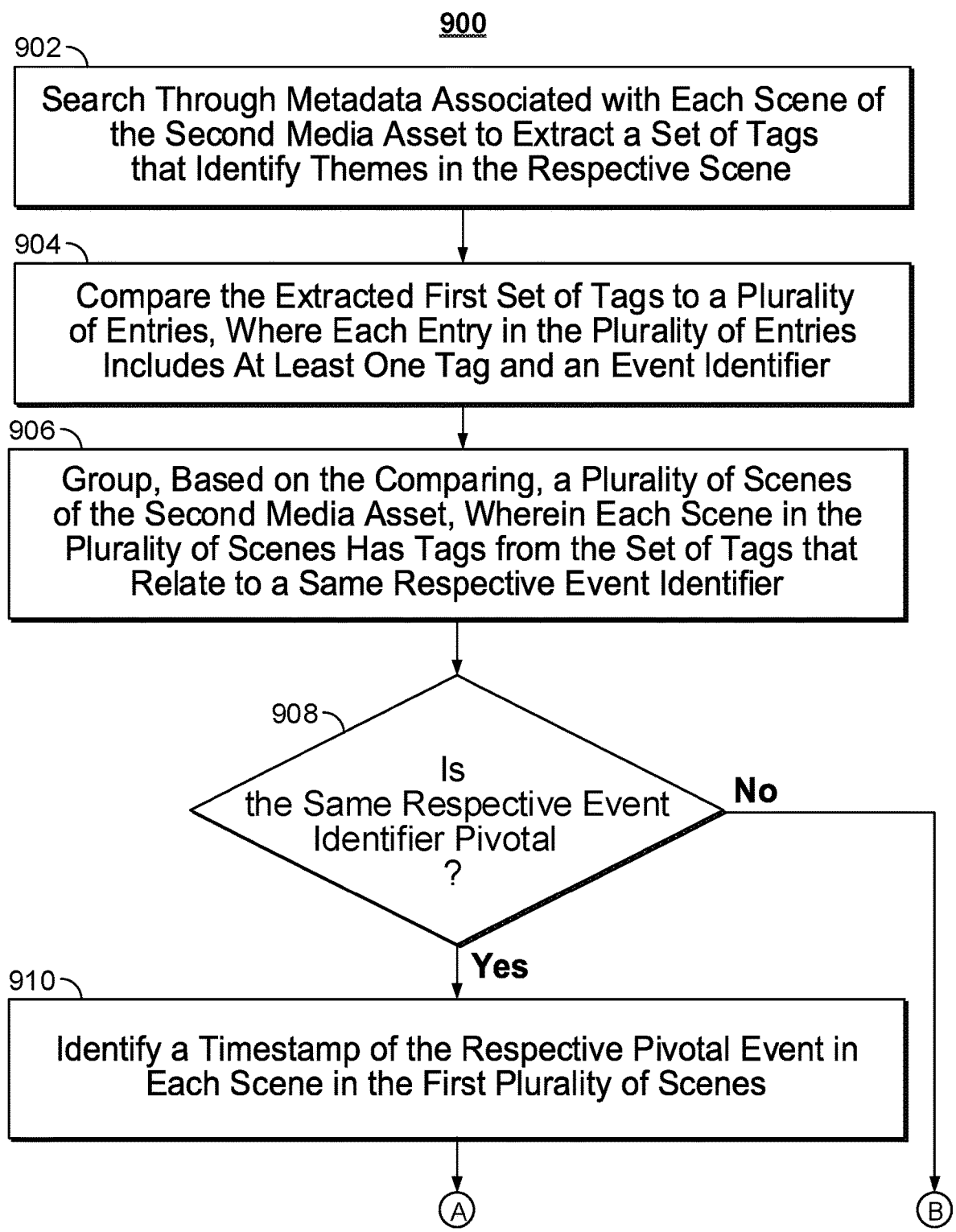
FIG. 9 is a flowchart of a detailed illustrative process for determining a second segment of the second media asset to display to a user, in accordance with some embodiments of the disclosure.
Figure 9:
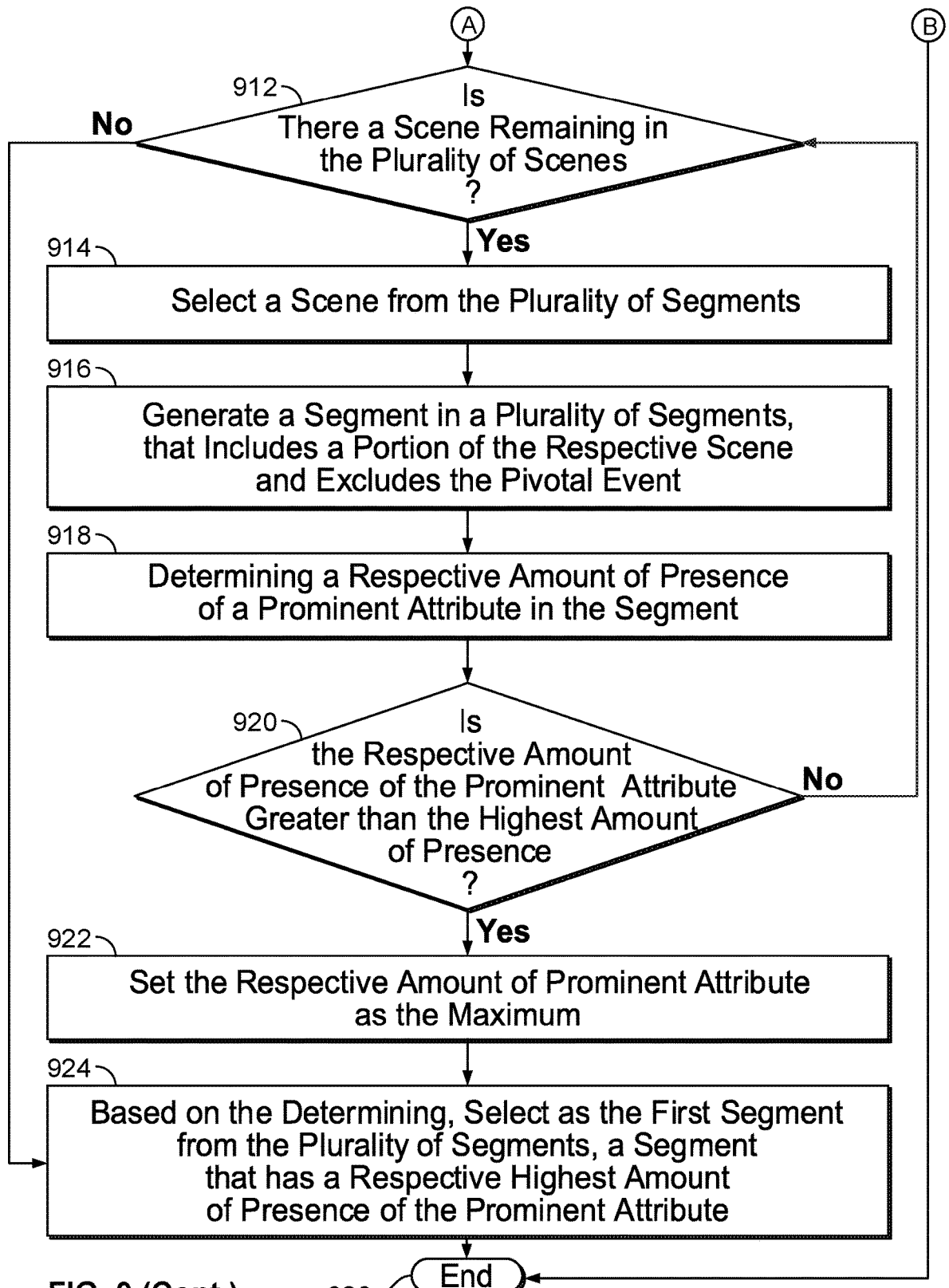

FIG. 9 is a flowchart of a detailed illustrative process for determining a first segment associated with the second media asset, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 900 may be incorporated into or combined with one or more steps of any other process or embodiment (e.g., as described in relation to FIGS. 6-8 and 10). Many elements of process 900 have been described above with respect to FIG. 1, and those descriptions have full force and effect with respect to the below description of process 900, and thus details on previously-described elements are omitted for the sake of brevity.

Process 900 begins at 902 where control circuitry 404 searches through metadata associated with each scene of the second media asset, stored at storage 408, to extract a set of tags that identify themes in the respective scene. At 904, control circuitry 404 compares the extracted set of tags to a plurality of entries, where each entry in the plurality of entries includes at least one tag and an event identifier. At 906, control circuitry 404 groups, based on the comparing, a plurality of scenes from the second media asset, wherein each scene in the plurality of scenes has tags from the set of tags that relate to a same respective event identifier. At decision block 908, control circuitry 404 determines whether the same respective identifier is pivotal. In response to determining that the same respective identifier is pivotal, control circuitry 404 proceeds process 900 to 910 to identify a timestamp of the respective pivotal event in each scene in the plurality of scenes. In response to determining that the same respective identifier is not pivotal, control circuitry 404 proceeds process 900 to 926 to end. At decision block 912, circuitry 404 determines whether there is there a scene remaining in the plurality of scenes. In response to determining that there is a scene remaining in the plurality of scenes, control circuitry 404 moves process 900 to 914 to select a scene from the plurality of scenes. In response to determining that there is no scene remaining in the plurality of scenes, control circuitry 404 based on the determining, moves process 900 to 924 to select as the first segment from the plurality of segments, a segment that has a respective highest amount of presence of the prominent attribute. At 916, control circuitry 404 generates a segment in a plurality of segments, that includes a portion of the respective scene and excludes the pivotal event. At 918, control circuitry 404 determines a respective amount of presence of a prominent attribute in the scene. At decision block 920, control circuitry 404 determines whether the respective amount of presence of the prominent attribute greater than the highest amount of presence. In response to determining that the respective amount of presence of the prominent attribute greater than the highest amount of presence, control circuitry 404 moves process 900 to 922 to set the respective amount of prominent attribute as the maximum. In response to determining that the respective amount of presence of the prominent attribute not greater than the highest amount of presence, control circuitry 404 moves process 900 to decision block 912 to repeat the process for a different scene in the plurality of scenes.

Figure 10:
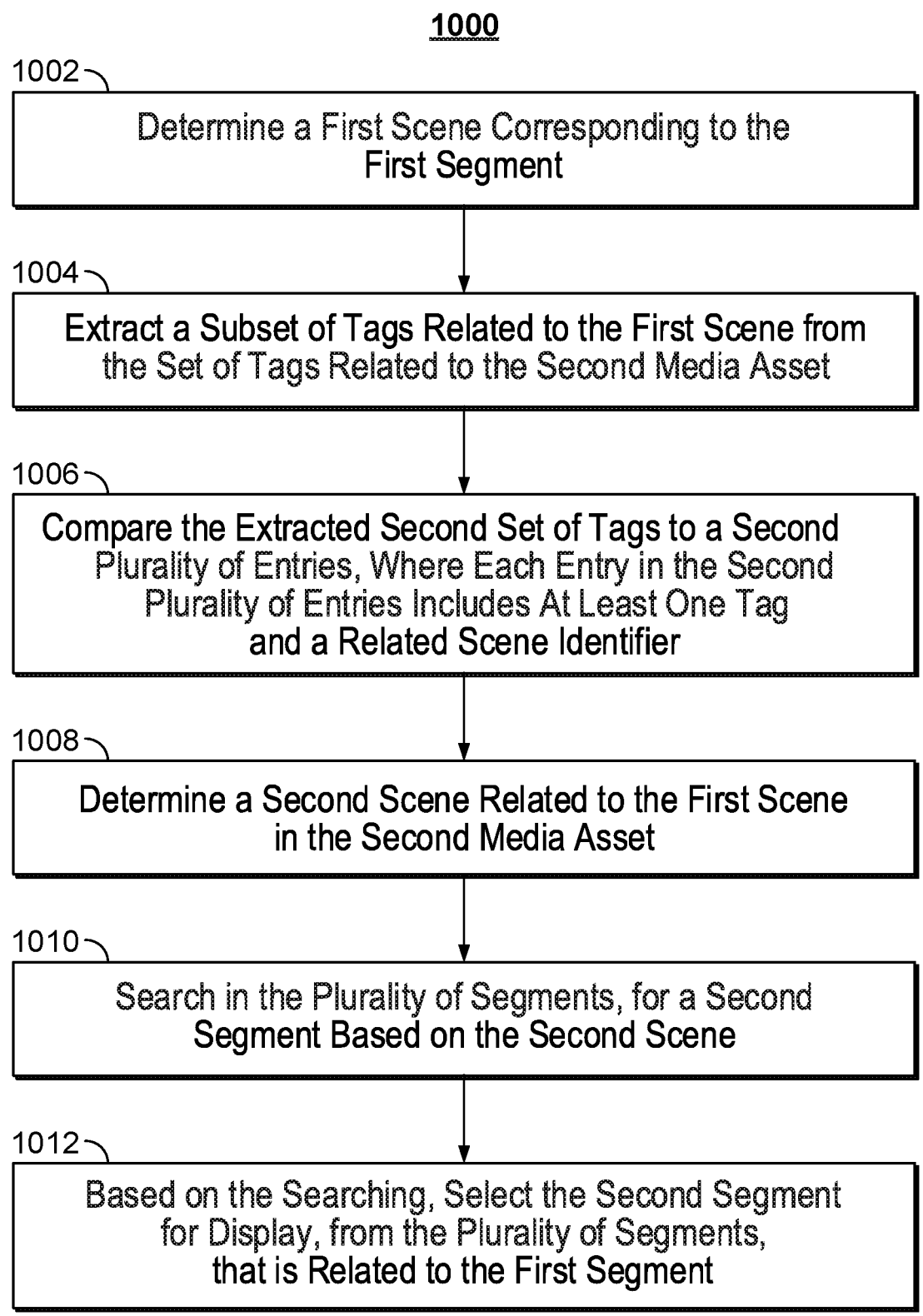
FIG. 10 is a flowchart of a detailed illustrative process for determining a first segment associated with the second media asset, in accordance with some embodiments of the disclosure.

FIG. 10 is a flowchart of a detailed illustrative process for determining a second segment of the second media asset to display to a user, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 1000 may be incorporated into or combined with one or more steps of any other process or embodiment (e.g., as described in relation to FIGS. 6-9). Many elements of process 1000 have been described above with respect to FIG. 1, and those descriptions have full force and effect with respect to the below description of process 1000, and thus details on previously-described elements are omitted for the sake of brevity.

Process 1000 begins at 1002, where control circuitry 404 determines a first scene corresponding to the first segment. At 1004, control circuitry 404 extracts a second set of tags from metadata stored at storage 408 related to the first scene from the set of tags related to the second media asset. At 1006, control circuitry 404 compares the extracted second set of tags to a second plurality of entries at storage 408, where each entry in the second plurality of entries includes at least one tag and a related scene identifier. At 1008, control circuitry 404 determines a second scene related to the first scene in the second media asset. At 1010, control circuitry 404 searches in the plurality of segments, for a second segment based on the second scene. At 1012, based on the searching, control circuitry 404 selects the second segment for display on display 412 of user equipment device 102, from the plurality of segments, that is related to the first segment.

What is claimed is:

1. A method for generating different clips of a movie to advertise the movie while the user is watching a media asset, the method comprising:
   determining a prominent attribute of the media asset that is being played back to a user;
   selecting, from a plurality of candidate media assets for partial exposure to the user, the movie that features the prominent attribute of the media asset;
   determining an end to a first scene of the media asset featuring the prominent attribute has occurred; and
   in response to determining the end to the first scene has occurred:
     determining a second attribute of the first scene;
     determining a first clip of the movie featuring the prominent attribute and the second attribute;
     playing back the first clip of the movie; and
     resuming playback of the media asset;
   determining, during the resumed playback of the media asset, that an end to a second scene of the media asset featuring the prominent attribute has occurred; and
   in response to determining that the end to the second scene has occurred:
     determining a third attribute of the second scene, different from the second attribute of the first scene;
     determining a second clip of the movie featuring the prominent attribute and the third attribute;
     playing back the second clip of the movie; and
     resuming playback of the media asset.

2. The method of claim 1, wherein determining the end to the first scene of the media asset further comprises:
   determining, from metadata associated with the media asset, an end time of the first scene;
   determining a second time, that is earlier than the end time, in the first scene at which the prominent attribute is no longer part of the first scene; and
   changing the end time of the first scene to the second time.

3. The method of claim 2, wherein playing back the first clip of the movie further comprises:
   determining supplemental content that is to be played back at the end time, wherein the supplemental content includes the first clip of the movie;

determining whether the end time has changed; and in response to determining that end time has changed, playing back the supplemental content at the second time in the media asset.

4. The method of claim 1, wherein determining the prominent attribute of a first media asset further comprises:

determining, from a profile of the user, a set of attributes desirable to the user;

comparing each attribute in the set of attributes to metadata describing the media asset;

determining, from the comparison, a respective amount of presence of each attribute in the set of attributes in the media asset; and selecting, as the prominent attribute from the set of attributes, a first attribute with a highest respective amount of presence in the first media asset.

5. The method of claim 4, wherein determining a second attribute of a media asset further comprises:

comparing each attribute in the set of attributes to metadata describing the first scene of the media asset;

determining, from the comparison, a different respective amount of presence of each attribute in the set of attributes in the first scene; and selecting, as the second attribute from the set of attributes, a second attribute with a highest respective amount of presence in the first scene of the media asset.

6. The method of claim 1, further comprising:

searching through metadata associated with each scene of the movie for a set of tags that identify themes in the respective scene;

comparing each of the extracted set of tags to a plurality of entries, wherein each respective entry in the plurality of entries maps at least one tag to a respective event identifier; and grouping, based on the comparing, a plurality of scenes of the movie, wherein each scene in the plurality of scenes has tags from the set of tags that relate to a same respective event identifier.

7. The method of claim 6, further comprising:

determining, whether the same respective event identifier is pivotal;

in response determining that the same respective event identifier is pivotal:

identifying a timestamp of the respective pivotal event in each scene in the plurality of scenes; and for each scene in the plurality of scenes:

generating a clip in a plurality of clips, that includes a portion of the respective scene and excludes the pivotal event.

8. The method of claim 7, wherein determining a first clip of the movie further comprises:

for each clip in the plurality of clips, determining a respective amount of presence of the prominent attribute; and based on the determining, selecting as the first clip from the plurality of clips, a clip that has a respective highest amount of presence of the prominent attribute.

9. The method of claim 8, wherein determining the second clip of the movie, further comprises:

determining a first scene corresponding to the first clip;

extracting a subset of tags related to the first scene from the set of tags related to the movie;

comparing the extracted subset of tags to a second plurality of entries, where each entry in the second plurality of entries includes at least one tag and a related scene identifier; and based on the comparison, determining a second scene related to the first scene in the movie.

10. The method of claim 9, further comprising:

searching in the plurality of clips, for a second clip based on the second scene; and based on the searching, selecting the second clip for display, from the plurality of clips, that is related to the first clip.

11. A system for generating different clips of a movie to advertise the movie while the user is watching a media asset, the system comprising control circuitry configured to:

determine a prominent attribute of the media asset that is being played back to a user;

select, from a plurality of candidate media assets for partial exposure to the user, the movie that features the prominent attribute of the first media asset;

determine an end to a first scene of the media asset featuring the prominent attribute has occurred; and in response to determining the end to the first scene has occurred:

determine a second attribute of the first scene;

determine a first clip of the movie featuring the prominent attribute and the second attribute;

play back the first clip of the movie; and resume playback of the media asset;

determine, during the resumed playback of the media asset, that an end to a second scene of the first media asset featuring the prominent attribute has occurred; and in response to determining that the end to the second scene has occurred:

determine a third attribute of the second scene, different from the second attribute of the first scene;

determine a second clip of the movie featuring the prominent attribute and the third attribute;

play back the second clip of the movie; and resume playback of the media asset.

12. The system of claim 11, wherein the control circuitry is further configured, when determining the end to the first scene of the media asset, to:

determine, from metadata associated with the media asset, an end time of the first scene;

determine a second time, that is earlier than the end time, in the first scene at which the prominent attribute is no longer part of the first scene; and change the end time of the first scene to the second time.

13. The system of claim 12, wherein the control circuitry is further configured, when playing back the first clip of the movie, to:

determine supplemental content that is to be played back at the end time, wherein the commercial includes the first clip of the movie;

determine whether the end time has changed; and in response to determining that end time has changed, play back the supplemental content at the second time in the media asset.

14. The system of claim 11, wherein control circuitry is further configured, when determining the prominent attribute of a first media asset, to:

determine, from a profile of the user, a set of attributes desirable to the user;

compare each attribute in the set of attributes to metadata describing the first media asset;

determine, from the comparison, a respective amount of presence of each attribute in the set of attributes in the media asset; and select, as the prominent attribute from the set of attributes, a first attribute with a highest respective amount of presence in the media asset.

15. The system of claim 14, wherein control circuitry is further configured, when determining a second attribute of a media asset, to:
compare each attribute in the set of attributes to metadata describing the first scene of the media asset;
determine, from the comparison, a different respective amount of presence of each attribute in the set of attributes in the first scene; and
select, as the second attribute from the set of attributes, a second attribute with a highest respective amount of presence in the first scene of the media asset.

16. The system of claim 11, wherein the control circuitry is further configured to:
search through metadata associated with each scene of the movie for a set of tags that identify themes in the respective scene;
compare each of the extracted set of tags to a plurality of entries, wherein each respective entry in the plurality of entries maps at least one tag to a respective event identifier; and
group, based on the comparing, a plurality of scenes of the movie, wherein each scene in the plurality of scenes has tags from the set of tags that relate to a same respective event identifier.

17. The system of claim 16, wherein the control circuitry is further configured to:
determine, whether the same respective event identifier is pivotal;
in response determining that the same respective event identifier is pivotal:
identify a timestamp of the respective pivotal event in each scene in the plurality of scenes; and
for each scene in the plurality of scenes:
generate a clip in a plurality of clips, that includes a portion of the respective scene and excludes the pivotal event.

18. The system of claim 17, wherein the control circuitry is further configured, when determining a first clip of the movie, to:
for each clip in the plurality of clips, determine a respective amount of presence of the prominent attribute; and
based on the determining, select as the first clip from the plurality of clips, a clip that has a respective highest amount of presence of the prominent attribute.

19. The system of claim 18, wherein the control circuitry is further configured, when determining the second clip of the movie, to:
determine a first scene corresponding to the first clip;
extract a subset of tags related to the first scene from the set of tags related to the movie;
compare the extracted subset of tags to a second plurality of entries, where each entry in the second plurality of entries includes at least one tag and a related scene identifier; and
based on the comparison, determine a second scene related to the first scene in the movie.

20. The system of claim 19, wherein the control circuitry is further configured to:
search in the plurality of clips, for a second clip based on the second scene; and
based on the searching, select the second clip for display, from the plurality of clips, that is related to the first clip.

21. The method of claim 1, further comprising:
in response to determining that the end to the first scene has occurred, automatically pausing playback of the media asset,
wherein the resuming of the playback of the media asset in response to determining the end to the first clip has occurred is performed automatically;
in response to determining that the end to the second scene has occurred, automatically pausing playback of the media asset, and
wherein resuming the playback of the media asset in response to determining the end to the second clip has occurred is performed automatically.

22. The method of claim 1, wherein the media asset is a first movie different from the movie.

* * * * *

UNITED STATES PATENT AND TRADEMARK OFFICE
CERTIFICATE OF CORRECTION

PATENT NO. : 10,779,058 B2
APPLICATION NO. : 16/018859
DATED : September 15, 2020
INVENTOR(S) : Vishwas Sharadanagar Panchaksharaiah et al.

Page 1 of 1

It is certified that error appears in the above-identified patent and that said Letters Patent is hereby corrected as shown below:

In the Claims

Claim 3, Column 30, Line 67, please change ":" to --;--

Claim 4, Column 31, Line 6, please delete "first"

Claim 4, Column 31, Line 16, please delete "first"

Claim 11, Column 32, Line 16, please delete "first"

Claim 11, Column 32, Line 27, please delete "first"

Claim 14, Column 32, Line 59, please delete "first"

Claim 14, Column 32, Line 63, please delete "first"

Signed and Sealed this
Third Day of November, 2020

Andrei Iancu
*Director of the United States Patent and Trademark Office*